UNITED STATES PATENT OFFICE.

MARTIN MOEST, OF BODIO, SWITZERLAND, AND MORITZ ECKARDT, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PROCESS OF PREPARING NITRIC ACID OF HIGH CONCENTRATION.

1,145,162.      Specification of Letters Patent.     Patented July 6, 1915.

No Drawing.     Application filed June 10, 1914. Serial No. 844,245.

*To all whom it may concern:*

Be it known that we, MARTIN MOEST, Ph. D., chemist, and MORITZ ECKARDT, Ph. D., chemist, citizens of the Empire of Germany, residing at Bodio, Switzerland, and Höchst-on-the-Main, Germany, respectively, have invented certain new and useful Improvements in the Process of Preparing Nitric Acid of High Concentration, of which the following is a specification.

Hitherto highly concentrated nitric acid could be produced from dilute nitric acid only with the aid of dehydrating agents such, for instance, as sulfuric acid, phosphoric acid, calcium nitrate or the like.

In U. S. Patent No. 1,050,160 is described and claimed a process by which diluted nitric acid can be converted into an acid of over 70 per cent. strength without the aid of dehydrating agents; it is impossible, however, to obtain by this process acids of higher concentrations than 78–80 per cent.

Our present invention relates to a process by which it is possible to obtain an acid even of the highest concentration without having to add one of the aforesaid agents. This process consists in boiling nitric acid of a strength greater than that corresponding with the lowest vapor-pressure, for instance the nitric acid obtainable by the process described in the said U. S. Patent No. 1,050,160, and thus separating from it the strong acid of lower boiling point, while the dilute acid of higher boiling point is prevented from distilling over.

The process may, for instance, be carried out as follows:—The acid to be concentrated is heated in some boiling vessel and the vapors are caused to pass through an apparatus acting as a dephlegmator, for instance through a fractionating column. In this column a suitable temperature is maintained so that the portions of the acid which boil at a higher temperature are condensed, whereas the vapors of the strong acid boiling at a lower temperature remain uncondensed and leave the column to be condensed in an ordinary condenser.

It is advantageous to make the process continuous by running the acid to be concentrated (if desired after being previously warmed) into the column while the boiling vessel contains acid of the lowest vapor pressure. The concentrated acid is continuously condensed and collected in the receiver while the weak acid produced is continuously run off either directly or after it has been conducted back into the boiling vessel. The concentration of the acid which distils over depends on the temperature of the column, whereas the concentration of the remaining acid depends, as usually, on the pressure prevailing in the apparatus. If the process is conducted under a diminished pressure, the temperature of the column must be lowered accordingly. In order to obtain and maintain the desired temperature of the column, the latter may be heated externally by surrounding it with a steam-jacket or the necessary heat may be supplied inside the column, advantageously by means of nitric acid vapors which are produced in the boiling-vessel. The heating process may also be regulated and accelerated by warming the acid to be concentrated before it flows into the apparatus. The residual nitric acid of the lowest vapor pressure may be re-concentrated in the known manner, for instance by the process described in the said U. S. Patent No. 1,050,160 so that, when using water, nitric oxids and oxygen as starting materials, an acid of the highest concentration is obtained.

Having now described our invention, what we claim is:

1. The process of preparing nitric acid of highest concentration, which consists in heating diluted nitric acid the percentage strength of which is higher than that of the acid of the lowest vapor-pressure, in the absence of any dehydrating agent, causing the vapors to pass through a fractionating column in which the temperature is kept at a degree corresponding with the desired concentration, and finally condensing the vapors passing over.

2. The process of preparing nitric acid of highest concentration, which consists in heating diluted nitric acid the percentage strength of which is higher than that of the acid of the lowest vapor-pressure, in the absence of any dehydrating agent, causing the vapors to pass through a fractionating column in which the temperature is kept at a degree corresponding with the desired concentration, and finally condensing the vapors passing over, the residual acid of the lowest vapor-pressure being enriched to a higher concentration and subjected again to the foregoing treatment.

3. The process of preparing nitric acid of highest concentration which consists in conducting diluted nitric acid the percentage strength of which is higher than that of the acid of the lowest vapor-pressure, into a column in which the temperature is kept at a degree corresponding to the desired concentration, and finally condensing the vapors passing over, whereby a heating in the column is effected by the vapors of the acid of lowest vapor-pressure which is heated in the boiling vessel belonging to the column.

4. The process of preparing nitric acid of highest concentration which consists in conducting diluted nitric acid, the percentage strength of which is higher than that of the acid of the lowest vapor-pressure, in the absence of any dehydrating agent, into a column in which the temperature is kept at a degree corresponding to the desired concentration, and finally condensing the vapors passing over, whereby a heating in the column is effected by the vapors of the acid of lowest vapor-pressure which is heated in the boiling vessel belonging to the column.

In testimony whereof, we affix our signatures in presence of two witnesses.

MARTIN MOEST.
MORITZ ECKARDT.

Witnesses:
 JEAN GRUND,
 CARL GRUND.